(12) United States Patent
Westfall et al.

(10) Patent No.: US 11,149,899 B2
(45) Date of Patent: Oct. 19, 2021

(54) COMPRESSIBLE SUPPORT STRUCTURES

(71) Applicant: Ford Global Technologies, LLC, Dearborn, MI (US)

(72) Inventors: Christopher Westfall, San Francisco, CA (US); Siddharthan Selvasekar, Livermore, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 455 days.

(21) Appl. No.: 15/966,689

(22) Filed: Apr. 30, 2018

(65) Prior Publication Data

US 2019/0331290 A1    Oct. 31, 2019

(51) Int. Cl.
*F16M 11/20*    (2006.01)
*B60R 7/08*    (2006.01)

(52) U.S. Cl.
CPC ............... *F16M 11/20* (2013.01); *B60R 7/08* (2013.01); *F16M 2200/021* (2013.01); *F16M 2200/025* (2013.01)

(58) Field of Classification Search
CPC ............... F16M 11/20; F16M 11/041; F16M 2200/025; F16M 2200/021; F16M 2200/08; A47C 23/00; A47C 23/002; A47C 23/02; A47C 23/04; A47C 23/30; A47C 23/38; A47C 27/20; A47C 27/063; A47C 27/065; F16F 1/18; F16F 1/37; F16F 1/373; F16F 3/02; F16F 3/023; F16F 3/0873; F16F 3/10; F16F 3/0876
USPC ......... 267/80, 103, 106, 141, 108, 107, 160, 267/165, 86; 5/247, 255, 264.1, 719; 297/452.49, 452.62, 284.3
See application file for complete search history.

(56) References Cited

U.S. PATENT DOCUMENTS

| | | | | |
|---|---|---|---|---|
| 3,879,025 | A * | 4/1975 | Dillard | F16F 1/02 267/165 |
| 4,378,643 | A | 4/1983 | Johnson | |
| 6,113,082 | A * | 9/2000 | Fujino | A47C 23/002 267/103 |
| 6,477,727 | B1 * | 11/2002 | Fromme | A47C 23/002 267/81 |
| 6,637,735 | B2 * | 10/2003 | Monson | F16F 1/373 267/141 |
| 7,485,050 | B2 | 2/2009 | Rose | |
| 8,117,972 | B2 | 2/2012 | Winget et al. | |
| 2006/0145404 | A1 * | 7/2006 | Ostergaard | A47C 27/067 267/165 |
| 2007/0246873 | A1 * | 10/2007 | VanDeRiet | A47C 23/002 267/142 |
| 2008/0189868 | A1 * | 8/2008 | Wieland | A47C 23/0515 5/719 |

(Continued)

FOREIGN PATENT DOCUMENTS

WO    0048526    8/2000

*Primary Examiner* — Robert A. Siconolfi
*Assistant Examiner* — San M Aung
(74) *Attorney, Agent, or Firm* — David Coppiellie; Price Heneveld LLP

(57) ABSTRACT

An assembly includes a series of support structures. Each of the support structures includes a base, a top plate having a continuous surface area, and a connector coupling the base to the top plate. The connector assumes a compressed position when under load from an object. The support structures that are in an extended position provide a lateral retention force to the object.

18 Claims, 11 Drawing Sheets

(56) References Cited

U.S. PATENT DOCUMENTS

2011/0031665 A1* 2/2011 DeFranks ............... F16F 3/023
  267/144
2016/0316924 A1* 11/2016 Lobry .................... A47C 21/06

* cited by examiner

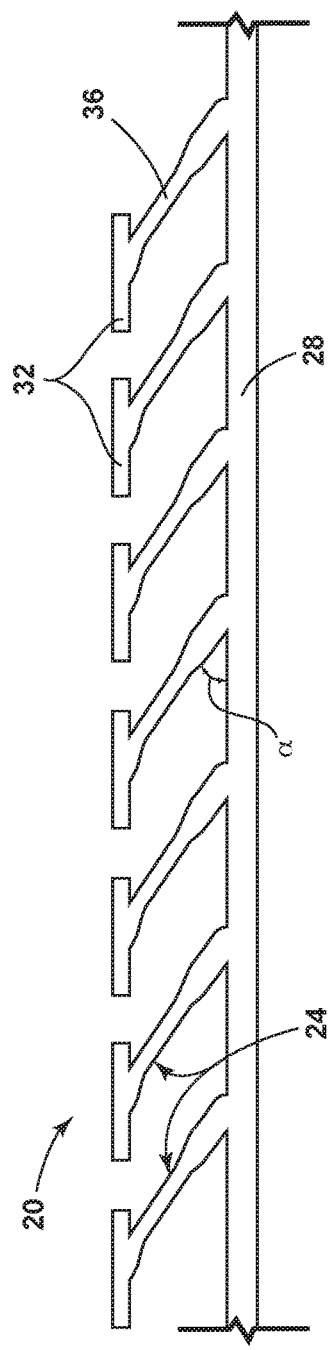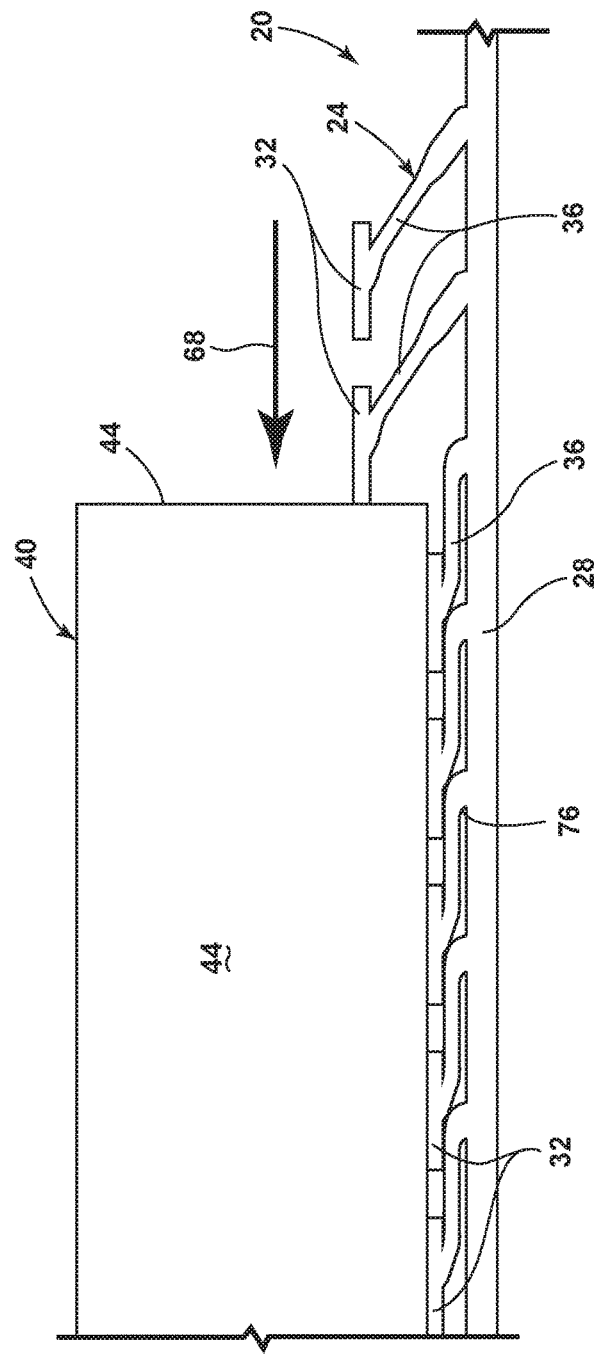

COMPRESSIBLE SUPPORT STRUCTURES

FIELD OF THE DISCLOSURE

The present disclosure generally relates to support surfaces. More specifically, the present disclosure relates to support surfaces having compressible support structures.

BACKGROUND OF THE INVENTION

Objects tend to be stored on support surfaces. In some environments, such as vehicles, the objects may be subjected to lateral forces that act on the object and may cause the object to move in a lateral direction relative to an area where the object was originally stored. Accordingly, there is a desire to provide alternative support surface solutions that address these issues.

SUMMARY OF THE INVENTION

According to a first aspect of the present disclosure, an assembly includes a series of support structures including a base, a top plate having a continuous surface area, and a connector coupling the base to the top plate. The connector assumes a compressed position when under load from an object. The support structures that are in an extended position provide a lateral retention force to the object.

Embodiments of the first aspect of the present disclosure can include any one or a combination of the following features:
- the connector includes a first hinge positioned between the base and a first arm and a second hinge positioned between the first arm and a second arm;
- the first hinge and the second hinge are configured to bend in opposite directions such that the second arm rests upon the first arm when the support structure is compressed;
- the top plate is provided with an angled surface that aids in directing the downward force such that the support structure is compressed in a predetermined manner;
- the connector extends from the base at an angle such that the top plate is horizontally displaced from the base when the support structure is in the compressed position and the extended position;
- the angle of the connector relative to the base is less than or equal to about forty-five degrees (45°);
- the top plates of the support structures that are in the compressed position are at least partially supported by the connectors of adjacent support structures;
- the series of support structures are configured in a predetermined manner such that the object is directed toward a center of the assembly;
- the support structures are generally pyramid-shaped and have a plurality of connectors associated with each of the top plates;
- the support structures assume one of a fully-compressed position and a partially-compressed position when the object interacts with the support structures, wherein the support structures that are in the partially-compressed position cooperate with the support structures that are in the extended position to provide the lateral retention force to the object;
- an aspect ratio of a surface area of a pyramid base to a surface area of the top plate is varied such that the object is directed toward a center of the assembly; and
- each of the bases is integrally formed with the bases of the support structures that are adjacent thereto.

According to a second aspect of the present disclosure, an assembly includes a series of support structures that each include a base, a top plate having a continuous surface area and cross-section, and a connector that extends from the base at an angle and couples the base to the top plate. The connector assumes a compressed position when under load from an object. The support structures that are in an extended position provide a lateral retention force to the object.

Embodiments of the second aspect of the present disclosure can include any one or a combination of the following features:
- the connector includes a first hinge positioned between the base and a first arm and a second hinge positioned between the first arm and a second arm;
- the connector extends from the base at an angle such that the top plate is horizontally displaced from the base when the support structure is in a compressed position and extended position; and
- the support structures are generally pyramid-shaped and have a plurality of the connectors associated with each of the top plates.

According to a third aspect of the present disclosure, an assembly includes a series of support structures including a base that is integrally formed with the bases of adjacent support structures, a top plate having a continuous surface area and cross-section, and a connector coupling the base and the top plate. The connector assumes a compressed position when under load from an object. The support structures that are in an extended position provide a lateral retention force to the object.

Embodiments of the third aspect of the present disclosure can include any one or a combination of the following features:
- the connector includes a first hinge positioned between the base and a first arm and a second hinge positioned between the first arm and a second arm;
- the connector extends from the base at an angle such that the top plate is horizontally displaced from the base when the support structure is in the compressed position and the extended position; and
- the support structures are generally pyramid-shaped and have a plurality of connectors associated with each of the top plates.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4A is a side view of the assembly, illustrating the support structures, according to another example;

FIG. 4B is a side view of the assembly, illustrating the support structures supporting an object according to one example;

DETAILED DESCRIPTION OF THE PREFERRED EMBODIMENTS

Figure 1:
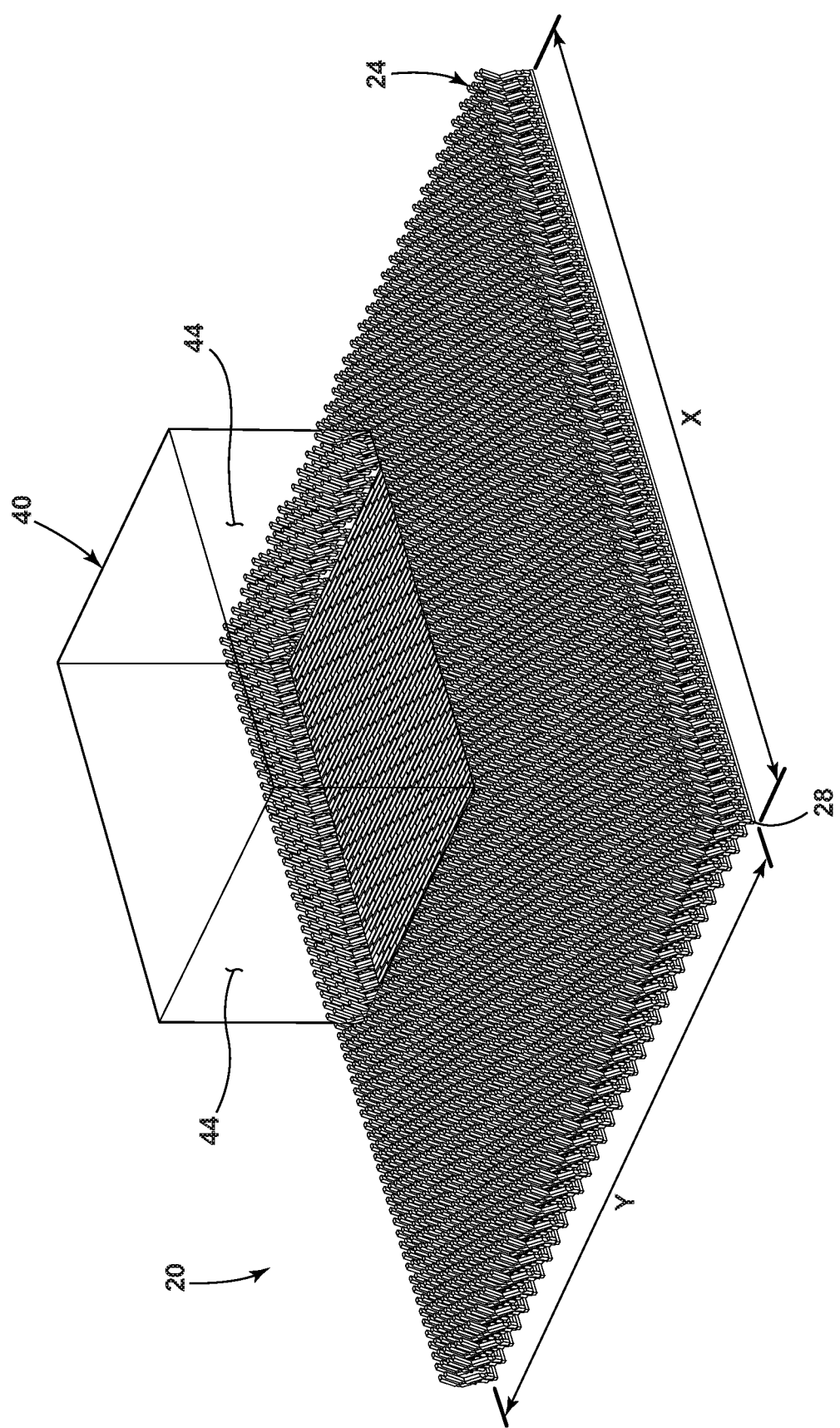
FIG. 1 is a side perspective view of an assembly, illustrating support structures supporting an object, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to compressible support structures. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-3C, an assembly 20 includes a series of support structures 24. The series of support structures 24 are made up of a plurality of individual support structure 24. Each of the support structures 24 includes a base 28, a top plate 32, and a connector 36. The top plate 32 is provided with a continuous surface area. In the present example, the top plate 32 is generally rectangular in shape and may have a rounded surface (e.g., convex or concave). The use of the phrase "continuous surface area" is intended to refer to the top plate 32 as having a continuous cross-section regardless of which direction the cross-section is taken at. For example, the top plate 32 may have a continuous surface area and cross-section when the cross-section is taken along a vertical and a horizontal direction. Said another way, the top plate 32 has a continuous surface area that extends between opposing sides of the top plate 32 along an entire length of the sides that oppose one another. In other words, the top plate 32 is a solid piece of material and does not have a hollow center. However, in the present example, the term continuous surface area is not intended to refer to a uniform profile or surface area. Accordingly, the surface area of the top plate 32 may be contoured. In the present example, the top plate 32 is contoured such that a surface of the top plate 32 is provided as an angled or contoured surface. The angled surface of the top plate 32 may aid in directing a downward force that is applied to the top plate 32 such that the support structure 24 is compressed in a predetermined manner. The downward force that is applied to the top plate 32 may be provided, for example, by an object 40 being placed on the assembly 20. Accordingly, in the present example, the top plate 32 is configured to translate vertical forces into lateral or rotational motion of at least a portion of the support structure 24.

Figure 2:
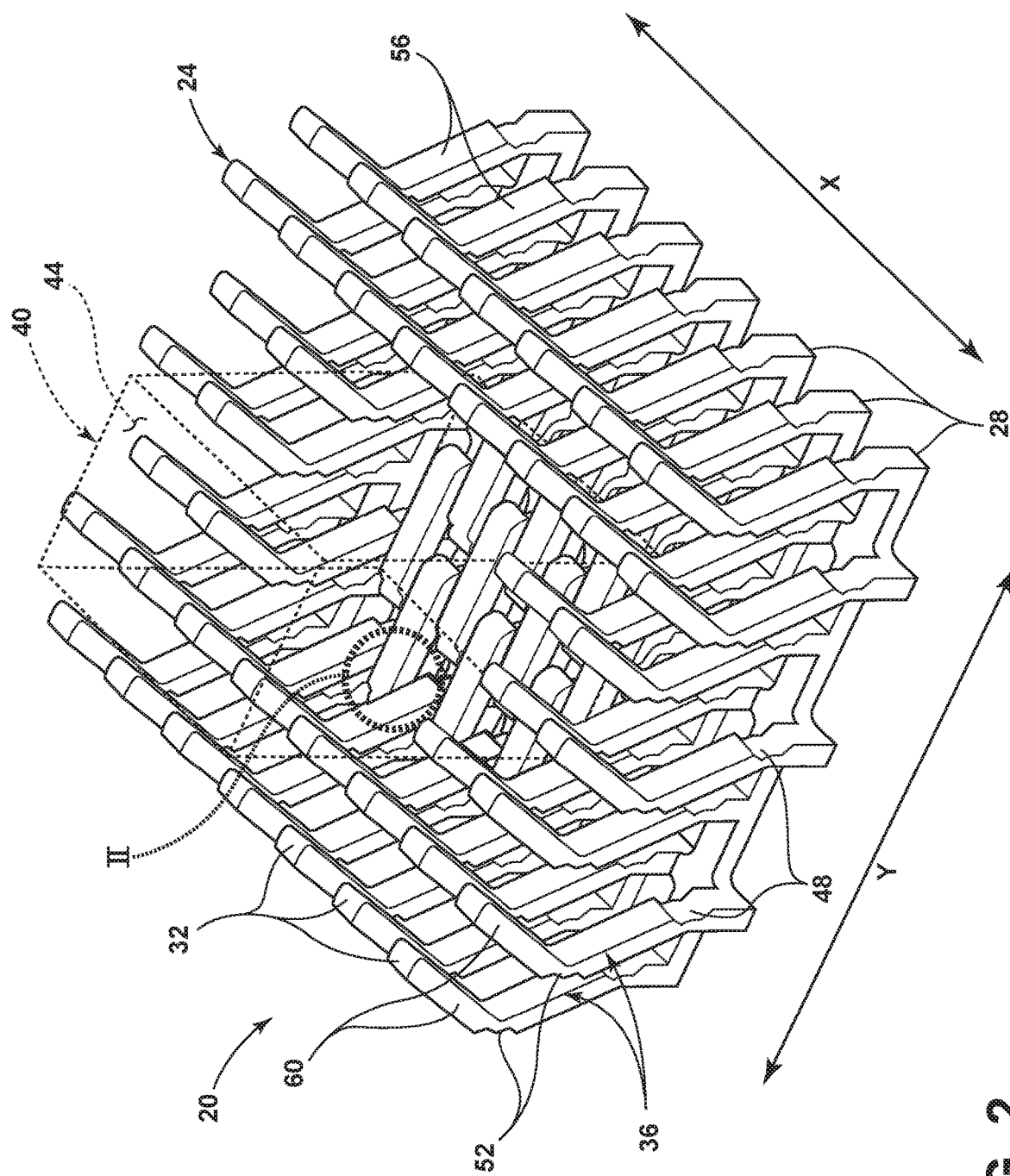
FIG. 2 is a top perspective view of the support structures, illustrating an extended position and a fully-compressed position, according to one example.
Figure 3A:
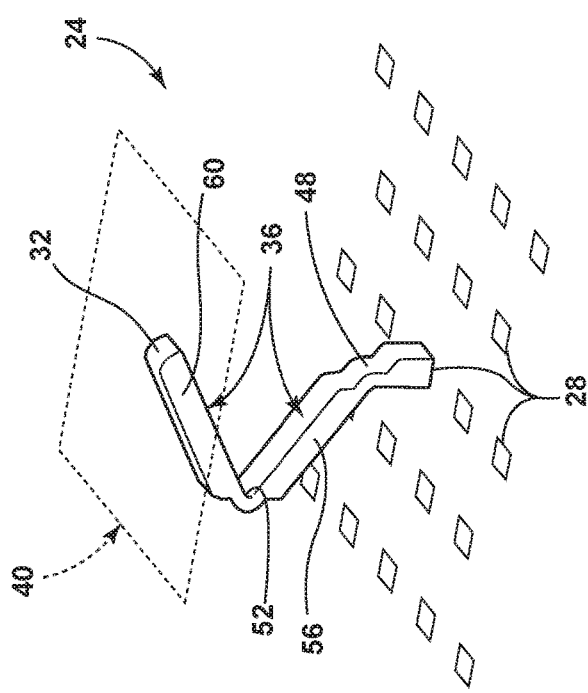
FIG. 3A is a side perspective view of an individual support structure in the extended position, according to one example.
Figure 3B:
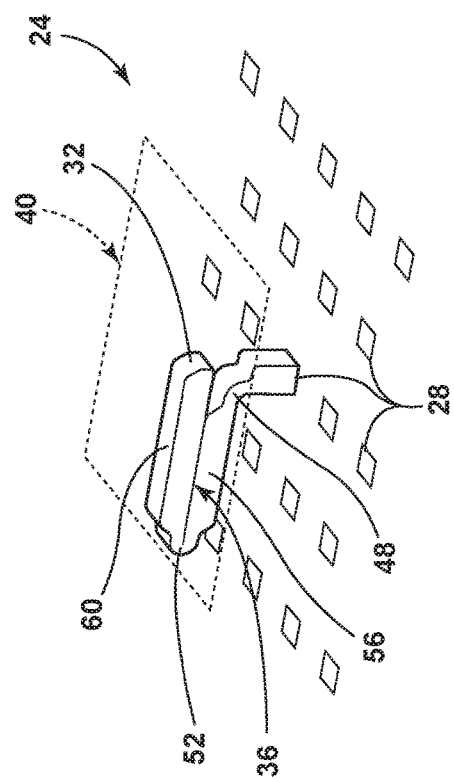
FIG. 3B is a side perspective view of the individual support structure in a partially-compressed position, according to one example.
Figure 3C:
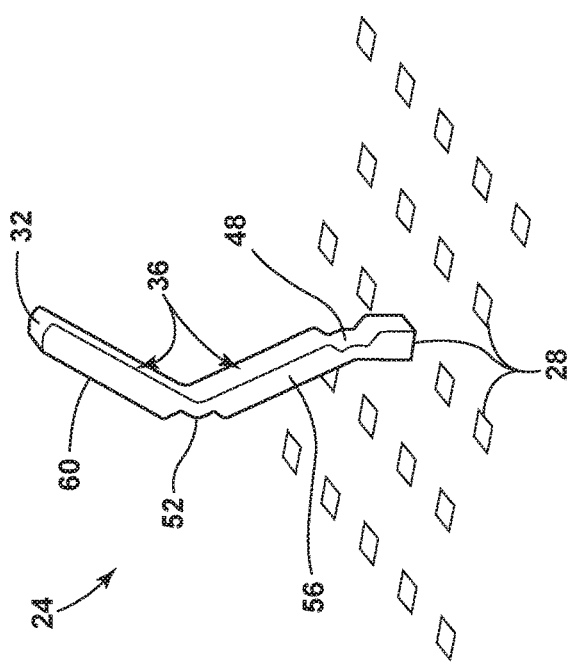
FIG. 3C is a side perspective view of the individual support structure in the fully-compressed position, according to one example.

Referring again to FIGS. 1-3C, when the top plate 32 experiences the downward force that is applied by the object 40, the connector 36 assumes a compressed position (FIG. 3C). Accordingly, the connector 36 is configured to buckle or compress when under load from the object 40. When the object 40 is placed on the assembly 20, there may be some of the support structures 24 that are not engaged by the object 40 and remain in an extended position (FIGS. 1, 2, and 3A). The support structures 24 that are in the extended position and adjacent to the object 40 may provide a lateral retention force to one or more sides 44 of the object 40. Compression of the support structures 24 from the extended position to the compressed position may be facilitated by a first hinge 48 and/or a second hinge 52 of the connector 36. The first hinge 48 is positioned between the base 28 and a first arm 56 of the connector 36. The second hinge 52 is positioned between the first arm 56 and a second arm 60. The second arm 60 is positioned between the second hinge 52 and the top plate 32. In the depicted example, the first hinge 48 and the second hinge 52 are configured to bend or rotate in opposite directions such that the second arm 60 rests upon the first arm 56 when the support structure 24 is in the compressed position.

Referring further to FIGS. 1-3C, the first and second hinges 48, 52 are made from the same material as the first arm 56 and the second arm 60. The first and second hinges 48, 52 are defined by a thickness of material that is less than a thickness of the material for the first and second arms 56, 60. Accordingly, when the connector 36 experiences a load, for example from the object 40, the connector 36 compresses in a predetermined and predesigned manner. The angled surface of the top plate 32 in the present example is designed to direct the load applied to the top plate 32 by the object 40 in a direction that induces rotational or pivotable motion of the second arm 60 about the second hinge 52. As the second arm 60 rotates about the second hinge 52, the second arm 60 approaches the first arm 56 and eventually the load experienced by the top plate 32 induces rotational motion of the first arm 56 about the first hinge 48. In some cases, the first hinge 48 and the second hinge 52 experience rotational motion simultaneously rather than sequentially. Eventually, adjacent surfaces of the first arm 56 and the second arm 60 come into contact with one another (see FIG. 3C) and a fully-compressed position of the support structure 24 is assumed. Additionally, the object 40 is supported a distance above the base 28 such that the object 40 may not encounter fluids that may be present on the assembly 20 over the course of normal use of the assembly 20 (e.g., spills or precipitation from weather events). When the support structure 24 reaches the fully-compressed position, the top plate 32 may be generally positioned over the base 28 and/or the first hinge 48. Additionally, when the support structure 24 is in the fully-compressed position, the first arm 56 and the second arm 60 are positioned generally rearward of the base 28 within a vacant space provided rearward of the base 28. Accordingly, the fully-compressed position of the support structure 24 places the support structure 24 in a staggered or interlocking arrangement with adjacent support structures 24 that are also in the fully-compressed position while not physically touching or interfering with adjacent support structures 24, as seen in the compressed support structures 24 highlighted at section II in FIG. 2. As can be seen in FIG. 2, the individual support structures 24 are laid out in a generally diamond-shaped arrangement where there is one of the support structures 24 positioned at each apex of the diamond shape. Said another way, the support structures 24 that are adjacent to one another in an X-direction are spaced apart a distance that is at least equivalent to a width of the connector 36 in the X-direction. Similarly, the support structures 24 that are adjacent to one another in a Y-direction are spaced apart a distance that is at least equivalent to a length of the connector 36 in the Y-direction when fully-compressed, which may include at least a portion of the first hinge 48 and/or the second hinge 52. In some examples, the first and second hinges 48, 52 may be referred to as living hinges.

Referring now to FIGS. 4A-7, the assembly 20 is shown according to another example. The assembly 20 includes the series of support structures 24. The series of support structures 24 are made up of a plurality of individual support structures 24. Each of the support structures 24 includes the base 28, the top plate 32, and the connector 36. The top plate 36 is provided with a continuous surface area. The use of the phrase "continuous surface area" is intended to refer to the top plate 32 as having a continuous cross-section regardless of which direction the cross-section is taken at. For example, the top plate 32 may have a continuous surface area and cross-section when the cross-section is taken along a vertical and a horizontal direction. Said another way, the top plate 32 has a continuous surface area that extends between opposing edges of the top plate 32 along an entire length of the edges that oppose one another. In other words, the top plate 32 is a solid piece of material and does not have a hollow center. A top surface 64 of the top plate 32 is generally planar or flat. Said another way, the top surface 64 of the top plate 32 in the present example is not contoured. However, the top plate 32 does have a geometric shape within the plane. In the present example, the top plate 32 is generally hexagonal in shape. While the top plate 32 in the depicted example is generally hexagonal in shape, the present disclosure is not so limited. Accordingly, the top plate 32 may be provided as any suitable geometric shape, such as circular, triangular, rectangular, pentagonal, hexagonal, heptagonal, octagonal, or any other polygon. However, it may be beneficial to provide the top plate 32 as a generally hexagonal shape such that a substantially continuous surface of the assembly 20 may be provided to support the object 40 while also facilitating a staggered arrangement of the individual support structures 24.

Referring again to FIGS. 4A-7, when the top plate 32 experiences the downward force that is applied by the object 40, the connector 36 assumes a compressed position (FIG. 4B). Accordingly, the connector 36 is configured to buckle, compress, and/or generally deflect when under load from the object 40. When the object 40 is placed on the assembly 20, there may be some of the support structures 24 that are not engaged by the object 40 and remain in an extended position (FIGS. 4B and 6). The support structures 24 that are in the extended position and adjacent to the object 40 may provide the lateral retention force, as indicated by arrow 68, to one or more of the sides 44 of the object 40. Compression of the support structures 24 from the extended position to the compressed position is facilitated by the spatial relationship between the base 28, the top plate 32, and the connector 36. The connector 36 extends from the base 28 at an angle, alpha ($\alpha$), such that the top plate 32 is horizontally displaced from the base 28 when the support structure 24 is in the compressed position and the extended position. The angle, alpha ($\alpha$), of the connector 36 relative to the base may be less than or equal to about forty-five degrees (45°). For example, the angle, alpha ($\alpha$), may be in the range of at least about one degree to at least about fifteen degrees, at least about fifteen degrees to at least about thirty degrees, at least about thirty degrees to less than about forty-five degrees, and/or combinations or ranges thereof including intermediate values. For example, the angle, alpha ($\alpha$), may be at least about one degree, at least about five degrees, at least about ten degrees, at least about fifteen degrees, at least about twenty degrees, at least about twenty-five degrees, at least about thirty degrees, at least about thirty-five degrees, at least about forty degrees, less than about forty-five degrees, and/or combinations or ranges thereof, including intermediate values. Providing the connector 36 with the angle, alpha ($\alpha$), less than or equal to about forty-five degrees may aid in a controlled compression of the support structure 24. By providing the connector 36 at the angle, alpha ($\alpha$), of less than or equal to about forty-five degrees, the downward force, indicated with arrow 72 in FIG. 6, provided by the object 40 is more likely to compress the support structure 24 in a predetermined manner. For example, the support structure 24 receives the object 40 on the top plate 32, the downward force induces compression of the support structure 24 about a pivot point 76, and the support structure 24 assumes the compressed position. The pivot point 76 may be located along the connector 36. For example, the pivot point 76 may be positioned at a location on the connector 36 that is proximal the base 28 (see FIG. 4B). In some examples, the connector 36 is provided with a first thickness 80 and a second thickness 84. In such examples, the pivot point 76 may be located at a junction or inflection point of the connector 36 where the first thickness 80 transitions to the second thickness 84. It may be beneficial to provide the first thickness 80, which is depicted as nearest to the base 28, as greater than the second thickness 84, which is depicted nearer to the top plate 32. In such an example, the increased thickness proximal the base 28 provides increased stiffness, decreased compliance, and/or decreased deflection as the support structures 24 experience greater load from heavier objects 40. Accordingly, as the support structures 24 deflect in the vertical direction due to the load from the object 40, the support structures 24 may provide increased resistance or support to the object 40. Said another way, the elastic modulus of the support structures 24 may have a direct correlation or relationship with the deflection of the support structures 24 from the extended position such that the elasticity increases under greater deflection. In some examples, the connectors 36 may have a thickness that continuously varies along the length of the connectors 36 such that the connectors 36 are not defined by one or two thickness, but rather by a thickness that is better defined as continually varied with a distance from the base 28 and/or the top plate 32. These features may allow for predictive compliance of the support structures 28. One of skill in the art will recognize that the predictive compliance or predetermined compliance may be tuned to provide the assembly 20 with varying degrees of compliance based on an intended use. For example, thicknesses of the connectors 36 may be adjusted to provide a light-duty, a medium-duty, and a heavy-duty support range to accommodate various weights of objects 40 that may be stored upon the assemblies 20.

Referring further to FIGS. 4A-7, once the support structure 24 has assumed the compressed position, the top plates 32 may be at least partially supported by the connectors 36 of adjacent support structures 24, see FIGS. 4B and 6. For example, an underside of the top plate 32 may engage with a nearside surface of the adjacent support structure 24 when in the compressed position. Additionally or alternatively, an area of the support structure 24 that is proximal a junction between the top plate 32 and the connector 36 may engage with the adjacent support structure 24 at an area of the adjacent support structure 24 that is proximal a junction between the base 28 and the connector 36 of the adjacent support structure 24, such as proximal to the pivot point 76. Accordingly, the object 40 is supported to a greater degree by the assembly 20 and the individual support structures 24 are subjected to less stress, which leads to less fatiguing and greater longevity. Additionally, the object 40 is supported a distance above the base 28 such that the object 40 may not encounter fluids that may be present on the assembly 20 over the course of normal use of the assembly 20 (e.g., spills or precipitation from weather events).

Figure 5:
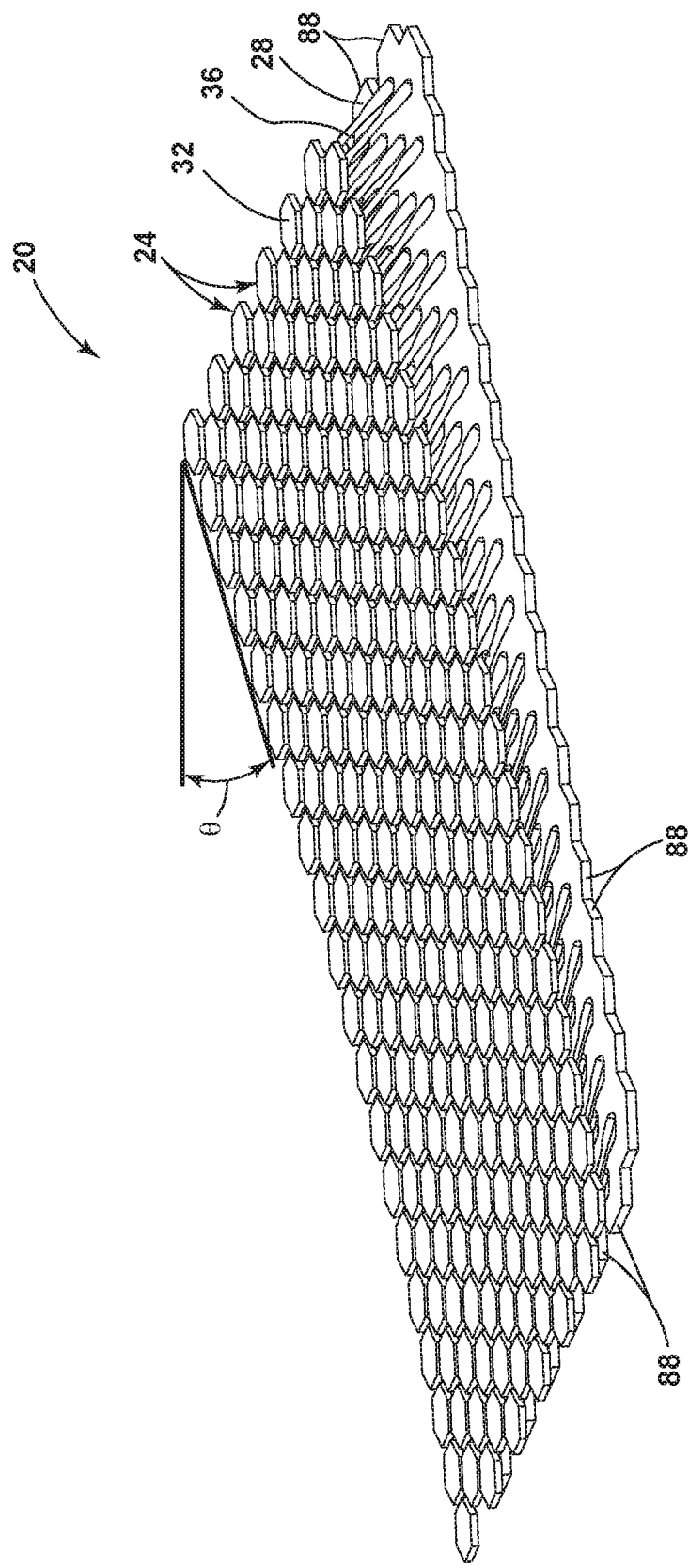
FIG. 5 is a side perspective view of the assembly, illustrating the support structures with a varied aspect ratio with respect to a vertical height of the support structures, according to one example.
Figure 6:
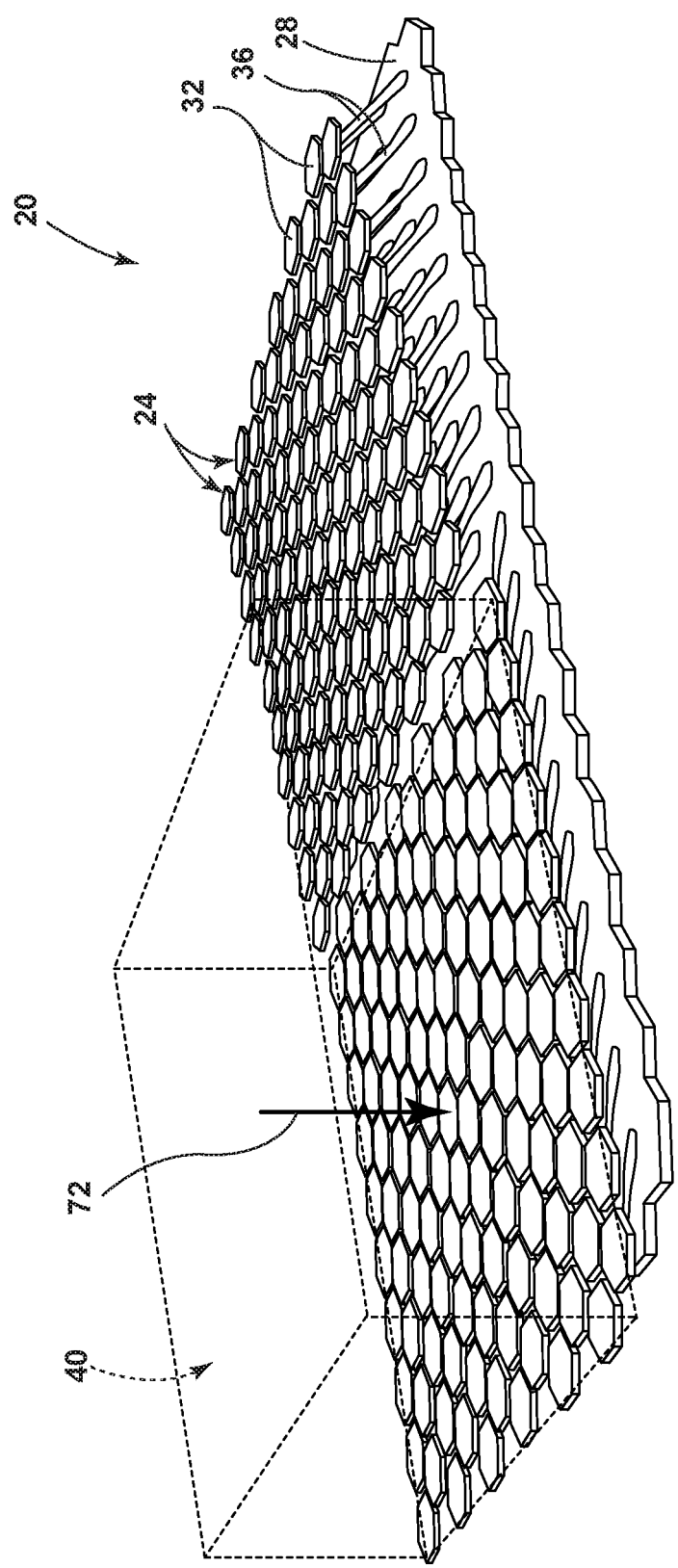
FIG. 6 is a side perspective view of the assembly, illustrating the support structures supporting the object, according to one example.
Figure 7:
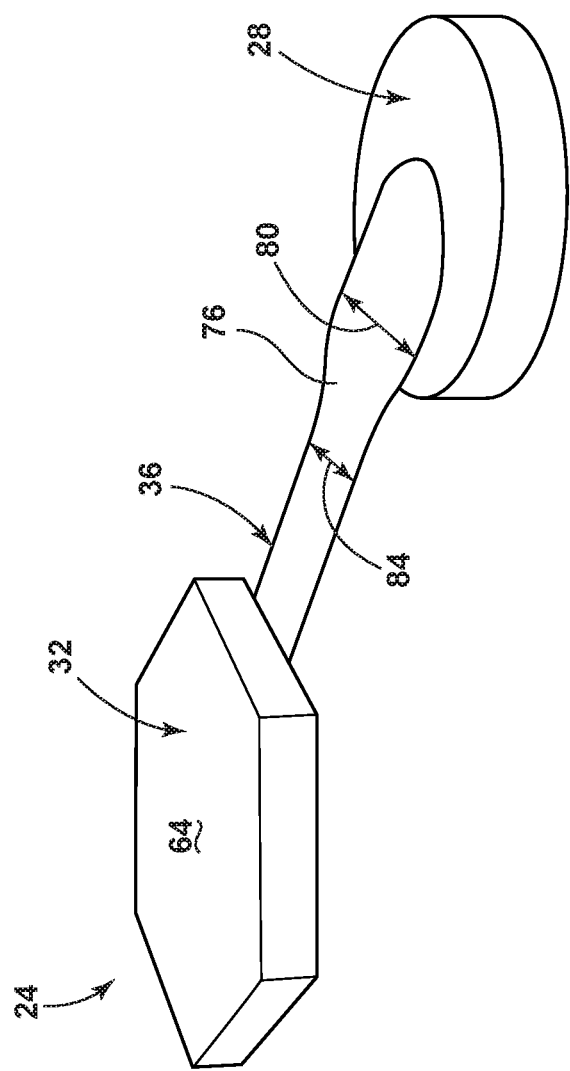
FIG. 7 is a side perspective view of an individual support structure, illustrating a top plate, a connector, and a base, according to one example.
Figure 8:
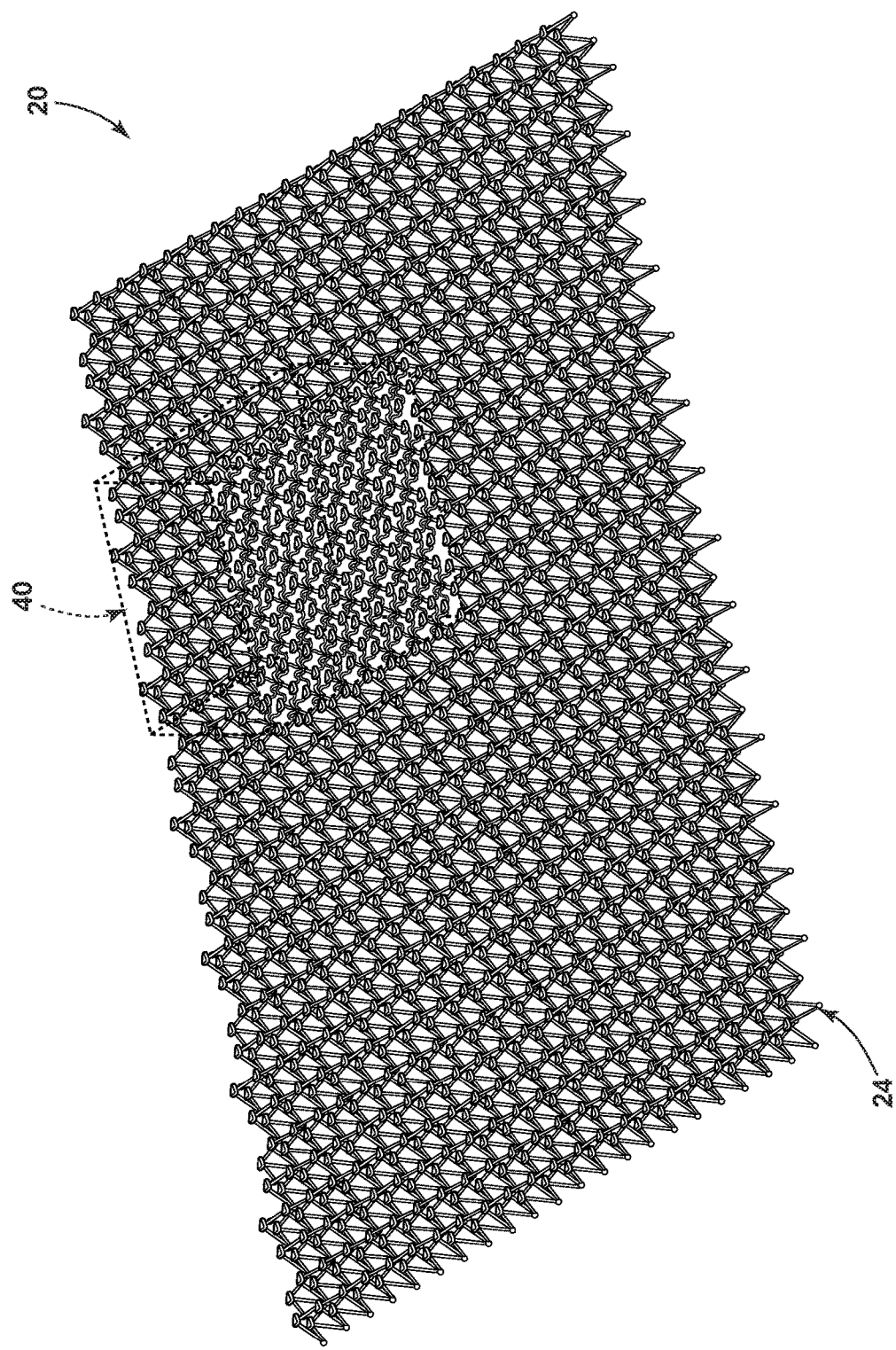
FIG. 8 is a top perspective view of the assembly, illustrating an object stored thereupon, according to another example.
Figure 9:
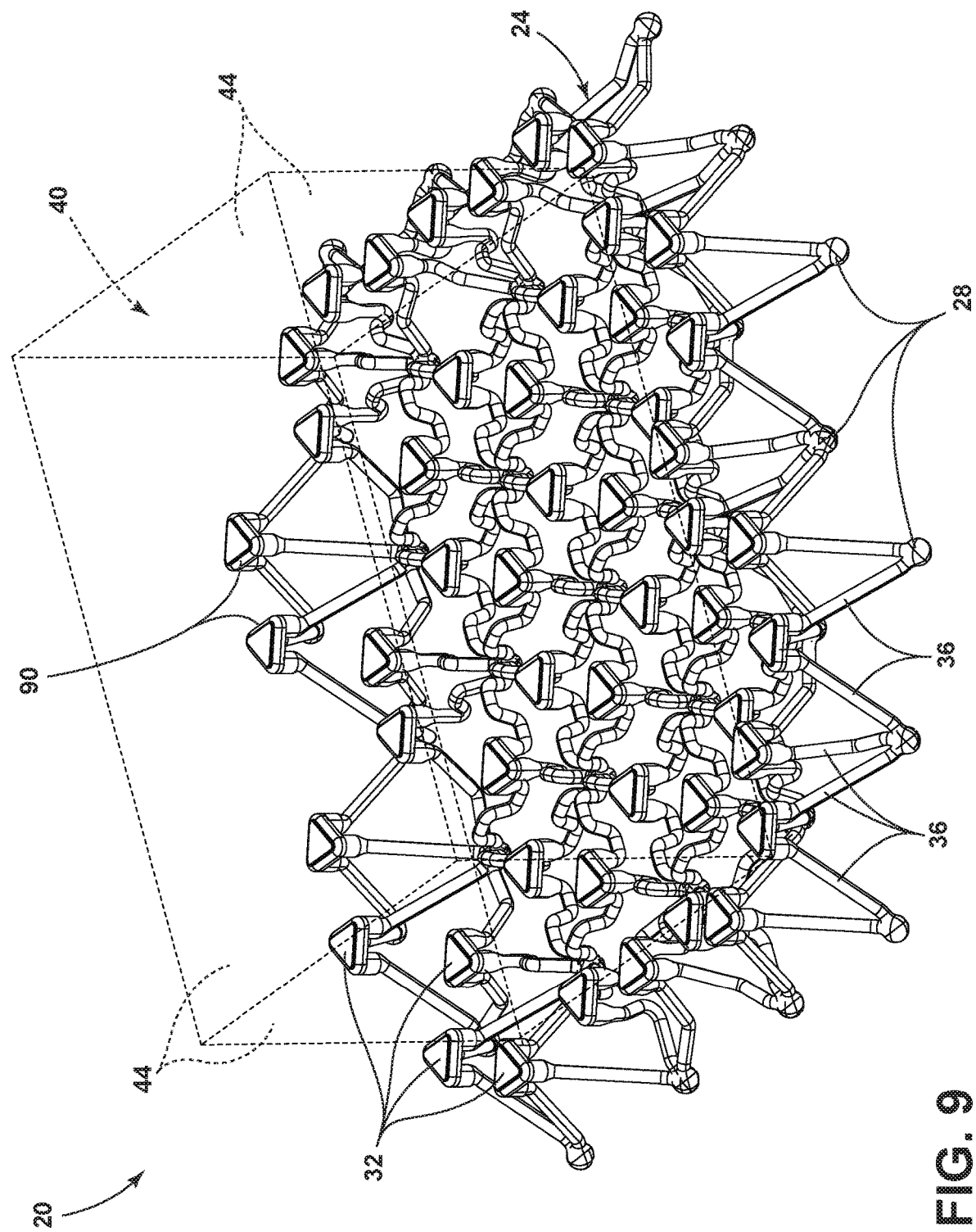
FIG. 9 is a top perspective view of the support structures, illustrating the extend position, the partially-compressed position, and the fully-compressed position, according to one example.

Referring still further to FIGS. 4A-7, the series of support structures 24 may be configured in a predetermined manner such that the object 40 is directed toward a center or edge of the assembly 20. As can be seen in FIG. 5, the support structures 24 may be provided at varying heights that decrease as the assembly 20 is traversed. For example, the top plates 32 may decrease linearly such that the top plate 32 with the greatest height and the top plate 32 with the lowest height are separated by a vertical distance that can be defined by an angle, theta ($\theta$), of the top plates 32 of the entire assembly 20. Alternatively, the top plates 32 may decrease in a non-linear fashion (e.g., in a parabolic fashion) that may generally correspond with the angle, theta ($\theta$). In some examples, the support structures 24 may "lean" or "point" toward the center or the edge of the assembly. In various examples, the angle, theta ($\theta$), may be at least about one degree, at least about five degrees, at least about ten degrees, at least about fifteen degrees, at least about twenty degrees, at least about twenty-five degrees, at least about thirty degrees, at least about thirty-five degrees, at least about forty degrees, at least about forty-five degrees, less than about forty-five degrees, less than about forty degrees, less than about thirty-five degrees, less than about thirty degrees, less than about twenty-five degrees, less than about twenty degrees, less than about fifteen degrees, less than about ten degrees less than about five degrees, and/or combinations or ranges thereof, including intermediate values. As shown in FIG. 5, an edge 88 of the base 28 may be contoured. The contours of the edge 88 may be utilized to connect or interlock more than one of the assemblies 20 to provide a greater surface area of the support structures 24. Accordingly, connecting a number of the assemblies 20 that are provided with the varied height support structures 24 described above may be arranged such that the object 40 may be directed toward a center, side, or preferred region of a compartment equipped with the assemblies 20. For example, a number of the assemblies 20 may be oriented within a compartment in a vehicle such that the object 40 is less likely to exit the compartment unintentionally.

Referring to FIGS. 8-11, the series of support structures 24 is made up of a plurality of individual support structure 24. Each of the support structures 24 includes the base 28, the top plate 32, and the connector 36. The top plate 32 is provided with a continuous surface area. The use of the phrase "continuous surface area" is intended to refer to the top plate 32 as having a continuous cross-section regardless of which direction the cross-section is taken at. For example, the top plate 32 may have a continuous surface area and cross-section when the cross-section is taken along a vertical and a horizontal direction. Said another way, the top plate 32 has a continuous surface area that extends between opposing sides of the top plate 32 along an entire length of the sides that oppose one another. In other words, the top plate 32 is a solid piece of material and does not have a hollow center. The top surface 64 of the top plate 32 is generally planar or flat. However, the top surface 64 of the top plate 32 in the present example may be contoured. For example, the top plate 32 may be provided as a generally or substantially flat surface that includes a rounded edge 90. The top plate 32 is provided with a geometric shape. In the present example, the top plate 32 is generally triangular in shape. While the top plate 32 in the depicted example is generally triangular in shape, the present disclosure is not so limited. Accordingly, the top plate 32 may be provided as any suitable geometric shape, such as circular, triangular, rectangular, pentagonal, hexagonal, heptagonal, octagonal, or any other polygon.

Figure 10A:
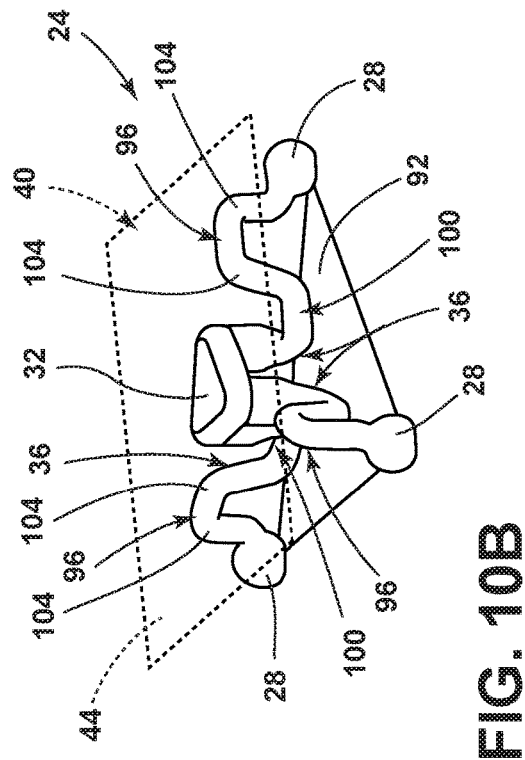
FIG. 10A is a side perspective view of the individual support structure in the extended position, according to one example.

Referring again to FIGS. 8-11, the support structures 24 of the assembly 20 may be generally pyramid-shaped and have a plurality of the connectors 36 associated with each of the top plates 32. In the depicted example, the support structures 24 assume one of a fully-compressed (FIG. 10B) position and a partially-compressed positioned (FIG. 10C) when the object 40 interacts with the support structures 24. When the object 40 is not interacting with the support structures 24, the support structures 24 are in the extended position (FIG. 10A). The lateral retention force, as indicated by the arrow 68, may be provided by the support structures 24 that are in the partially-compressed position and/or the extended position. Accordingly, the support structures 24 that are in the partially-compressed position may cooperate with the support structures 24 that are in the extended position to retain the object 40 in a lateral direction. When in the partially-compressed position, the support structures 24 may angle the top plates 32 toward the object 40 (see FIG. 10C). In the fully-compressed position, the connectors 36 that extend between the base 28 and the top plate 32 buckle or compress in a controlled manner. The bases 28 of the support structures 24 are integrally formed with the bases 28 of the support structures 24 that are adjacent thereto; however, the bases 28 are not interconnected with the rest of the bases 28, which is a difference between the present example and the previously described examples. Therefore, when the object 40 is placed upon the assembly 20, the support structures 24 that are placed under the load of the object 40 may enable or "recruit" neighboring or adjacent support structures 24 to aid in supporting the load of the object 40 and/or providing the lateral retention force by engaging the sides 44 of object 40. This enabling or recruiting of the neighboring or adjacent support structures 24 may be at least partially facilitated by the integral formation of the bases 28 of the adjacent support structures 24 while still providing the individual bases 28 as individual or discrete contact points with a support surface that the assembly 20 is placed upon. Said another way, the examples that were discussed with reference to FIGS. 1-3C and FIGS. 4A-7 provided the bases 28 of the support structures 24 as integrally formed with one another and also as a generally continuous structure or sheet. Accordingly, the examples that were discussed with reference to FIGS. 1-3C and FIGS. 4A-7 provided the bases 28 with a degree of rigidity in response to the load of the object 40. While it is contemplated that this rigidity may additionally be employed in the present example shown in FIGS. 8-11, the bases 28 are provided with more freedom or flexibility in the depicted example. The additional freedom and flexibility of the bases 28 allow the bases 28 to move across the support surface in response to the load of the object 40. The additional freedom and flexibility of the bases 28 also allows the assembly 20 to more actively engage or "react" to the object 40. Accordingly, the present example may enable the support structures 24 to engage with a greater surface area of the sides 44 of the object 40 and/or engage with the sides 44 of the object 40 to a greater vertical height on the side 44 of the object 40 than may otherwise be possible if the bases 28 were more rigidly coupled.

Figure 10B:
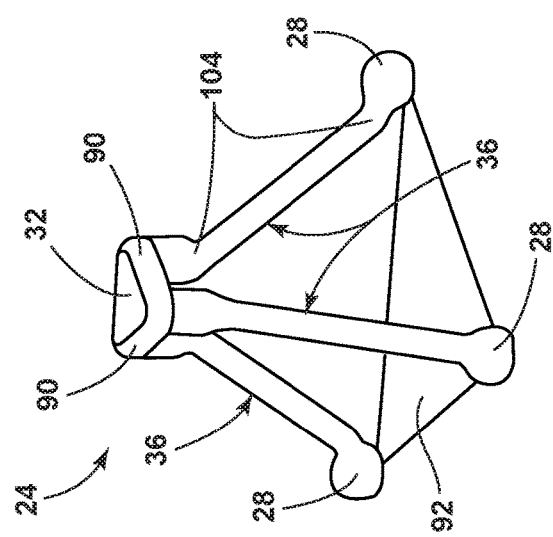
FIG. 10B is a side perspective view of the individual support structure in the fully-compressed position, according to one example.
Figure 10C:
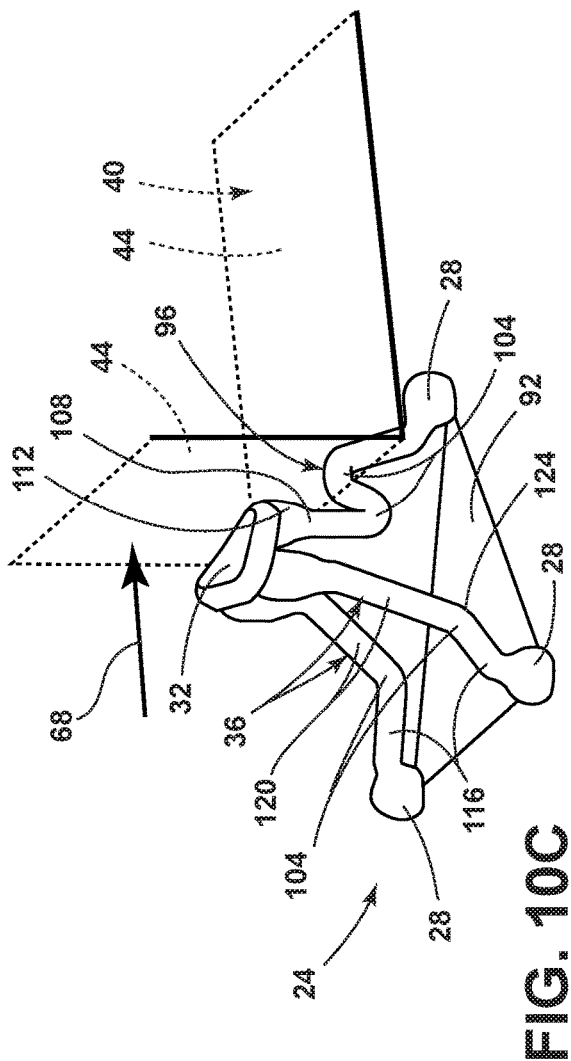
FIG. 10C is a side perspective view of the individual support structure in the partially-compressed position, according to one example.

Referring particularly to FIGS. 10A-10C, when the support structures 24 assume the fully-compressed position (FIG. 10B), the connectors 36 buckle or compress in a predetermined or controlled fashion. In the depicted example, the connectors 36 in the fully-compressed position are defined by a convex portion 96 and a concave portion 100. The convex portion 96 and the concave portion 100 are each defined by a plurality of inflection points 104. The convex portion 96 may be defined by at least one inflection point 104, at least two inflection points 104, at least three inflection points 104, at least four inflection points 104, and/or combinations or ranges thereof. Similarly, the concave portion 100 may be defined by at least one inflection point 104, at least two inflection points 104, at least three inflection points 104, at least four inflection points 104, and/or combinations or ranges thereof. In various examples, the convex portion 96 and the concave portion 100 may share at least one of the inflection points 104. The connectors 36 may be configured to provide additional support to the object 40 when in the fully-compressed position. For example, the connectors 36 may be configured such that at least a portion of the convex portion 96 contacts the object 40 and further distributes the load imparted by the object 40. Additionally or alternatively, the connectors 36 may be configured such that at least a portion of the concave portion 100 contacts the support surface upon which the assembly 20 rests to further distribute the load imparted by the object 40. In some examples, when the connectors 36 are in the extended position (FIG. 10A), the connectors 36 may be configured with at least one inflection point 104, at least two inflections points 104, at least three inflection points 104, at least four inflection points 104, and/or combinations or ranges thereof. Configuring the inflection points 104 in the connectors 36 when the connectors 36 are in the extended position may aid in the buckling or collapse of the connectors 36 in the predetermined manner.

Referring again to FIGS. 10A-10C, when the support structures 24 assume the partially-compressed position (FIG. 10C), the connectors 36 buckle or compress in a predetermined or controlled fashion. In the depicted example, the connectors 36 in the partially-compressed position are defined by two or more geometries. Said another way, the partially-compressed position provides one or more of the connectors 36 in a first geometry while one or more of the other connectors 36 are in a second geometry. For example, the first geometry may be assumed when a portion of the object 40 engages with the connector 36 rather than the top plate 32. In the depicted example, the first geometry is defined by the convex portion 96 and a linear portion 108. Similar to the convex portion 96 described above, the convex portion 96 in the partially-compressed position may be defined by at least one inflection point 104, at least two inflection points 104, at least three inflection points 104, at least four inflection points 104, and/or combinations or ranges thereof. The convex portion 96 may contact the object 40, for example on an underside thereof, and further distribute the load imparted by the object 40. Additionally, an abutting side 112 of the connector 36 may contact one of the sides 44 of the object 40 and provide some of the lateral retention force indicated by the arrow 68. The second geometry of the connectors 36 may be assumed by the connectors 36 that are not directly engaged by the object 40. In the depicted example, the second geometry is defined by a horizontal portion 116 and a slope portion 120. The connectors 36 in the second geometry transition from the horizontal portion 116 to the sloped portion 120 through one of the inflection points 104. The second geometry of the connectors 36 may provide some cushion or "give" to the object 40 as the object 40 is subjected to lateral forces. The cushion or "give" provided by the connectors 36 in the second geometry may be configured to be a limited amount of cushion or "give" that is limited by the connectors 36 contacting the support surface upon which they rest. The portion of the connector 36 that contacts the support surface in the second geometry may be referred to as an elbow 124. The elbow 124 may be opposite one of the inflection points 104. Said another way, the elbow 124 may be a side of the connector 36 that is nearest the support surface at a location on the connector 36 that is proximal to the location of the inflection point 104.

Figure 11:
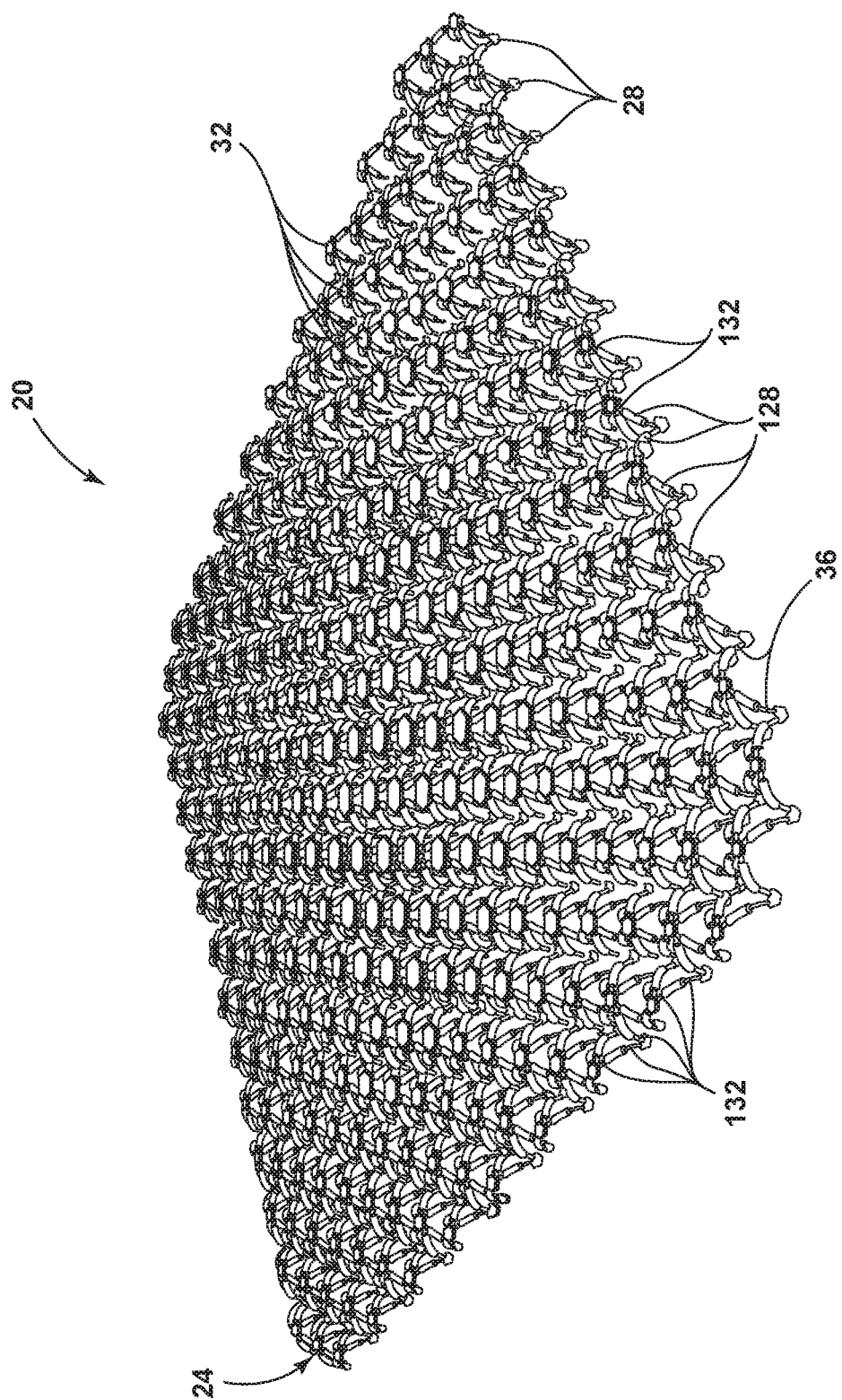
FIG. 11 is a side perspective view of the assembly, illustrating varied aspect ratio of the support structures, according to another example.

Referring particularly FIG. 10A-11, an aspect ratio of a surface area of a pyramid base 92 to a surface area of the top plate 32 may be varied such that the object 40 is directed toward a center of the assembly 20. The varied aspect ratio may be best seen in FIG. 11. Varying the aspect ratio of the surface area of the pyramid base 92 to the surface area of the top plate 32 may be accomplished in one of at least three ways. In a first approach, the aspect ratio may be varied by altering the surface area of the top plate 32 while maintaining the surface area of the pyramid base 92 as a constant. In a second approach, the aspect ratio may be varied by altering the surface area of the pyramid base 92 while maintaining the surface area of the top plate 32 as a constant. In a third approach, the surface area of the top plate 32 and the surface area of the pyramid base 92 may both vary in the X-axis and/or the Y-axis (FIG. 1). Regardless of the approach utilized to vary the aspect ratio of the surface area of the top plate 32 to the surface area of the pyramid base 92, the variance in the aspect ratio may be configured to direct the object 40 to a preferred region of the assembly 20, such as the edge or the center. According to one example, the directing or directional biasing of the assembly 20, as accomplished with the aspect ratio variance, may function by the support structures 24 in the preferred region (e.g., the center) of the assembly 20 providing more compliance or "give" than the support structures 24 that are located distal or away (e.g., along an edge) from the preferred storage area. Accordingly, when the object 40 is placed upon the assembly 20 at a location that is outside of the preferred region, the less compliant or stiffer support structures 24 may direct the object 40 to the more compliant or softer support structures 24 in the preferred region. Additionally, in such an example, the less compliant support structures 24 may provide a greater lateral retention force to the sides 44 of the object 40 and thereby further ensure that the object 40 remains in the preferred region even when substantial lateral forces act upon the object 40.

Referring again to FIGS. 10A-11, the connectors 36 may be provided with a thick portion 128 and a thin portion 132. The thick portion 128 may be positioned at an intermediate location along a length of the connectors 36. The thin portions 132 may flank either side of the thick portion 128 such that the thin portions 132 are positioned between the thick portion 128 and the base 28 on one side and between the thick portion 128 and the top plate 32 on another side. It is contemplated that the thick portion 128 and the thin portion 132 may be alternatively configured and may be provided in a different ratio without departing from the concepts disclosed herein. For example, the thin portion 132 may be additionally or alternatively positioned at an intermediate location of the thick portion 128 such that the thin portion 132 may be flanked on either side by the thick portion 128. Regardless of the arrangement, the thick portion 128 may be less compliant or stiffer than the thin portion 132 so as to control the buckling or collapse of the support structures 24 under the load of the object 40.

In each of the foregoing examples depicted in FIGS. 1-11, the assembly 20 and support structures 24 may be manufactured using Additive Manufacturing or three-dimensional (3D) printing. The structures and arrangements disclosed herein are prohibitively difficult or impossible to produce using traditional or any other manufacturing approach. It may be beneficial to manufacture the assembly 20 and the support structures 24 from a material that has a low modulus of elasticity such that the material is able to compress without being prone to brittle fracture as a result of the stress applied to the support structures 24 during compression and/or compression-extension cycles. Materials with a low modulus of elasticity may include, but are not limited to, woods, wood products, polymers, polymer foams, rubbers, and/or combinations thereof. Reference to low modulus materials is intended to encompass materials that have a relatively low Young's modulus. Young's modulus measures the resistance of a material to be elastic, or recoverable, following deformation under load. Materials that may be suitable for the present disclosure may be materials that have a Young's modulus that is less than about 1 gigapascals (GPa), less than about 0.5 GPa, less than about 0.1 GPa, less than about 0 GPa, less than about −0.1 GPa, less than about −0.5 GPa, less than about −1 GPa, and/or combinations or ranges thereof, including intermediate values. In various examples, in an effort to prevent the top plates 32 of adjacent support structures 24 from sticking together during manufacture, it may be beneficial to configure the assembly 20 such that the top plates 32 are spaced at least about 0.1 mm apart, at least about 0.3 mm apart, at least about 0.5 mm apart, at least about 0.7 mm apart, at least about 0.9 mm apart, and/or combinations or ranges thereof, including intermediate values.

Objects that are stored on conventional support surfaces, such as foam mats or elastic surfaces, have a tendency to exhibit a "trampoline" effect due to the top surface being continuous. The trampoline effect results in the object 40 being permitted to react to lateral forces, such as vehicle maneuvers, with a translation of the object 40 on the support surface due to the top surface not contacting the sides 44 of the object 40 adequately. The support structures 24 of the present disclosure remedy this issue by providing the lateral retention force to one or more of the sides 44 of the object 40. The lateral retention force is provided, at least in part, by the support structures 24 that are adjacent to the object 40 and are not in a fully-compressed position. Accordingly, the support structures 24 that are in a partially-compressed and/or an extended position provide the lateral retention force to the object 40. Therefore, by providing a discontinuous top surface to the assembly 20, the present disclosure prevents or eliminates the trampoline effect and provides an improved storage solution. The assembly 20 of the present disclosure and the associated examples of the support structures 24 may be utilized in a variety of environments. For example, the assembly 20 may be utilized in vehicles, such as motor vehicles, to retain packages, tools, or any other item a user may want to retain within a certain area. In one specific example, the assembly 20 may be utilized in autonomous or remote controlled delivery vehicles of various sizes. In such an example, it may be particularly beneficial to retain the object 40 in a specific location within the vehicle so that a recipient knows which object 40 to remove from the vehicle or so that the delivering entity can monitor accurate delivery to an intended recipient (e.g., by video or sensor monitoring a storage area or compartment of the vehicle). The assemblies 20 may be particularly desirable or beneficial in the transport of fragile items.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. An assembly, comprising:
    a series of support structures, each comprising:
        a base;
        a top plate having a continuous surface area; and
        a connector coupling the base to the top plate, wherein the connector assumes a compressed position when under load from an object, wherein the connector extends from the base at an angle such that the top plate is horizontally displaced from the base when the support structure is in the compressed position and an extended position, wherein the top plates of the support structures that are in the compressed position are at least partially supported by the connectors of adjacent support structures, wherein the support structures that are in the extended position provide a lateral retention force to the object, and wherein the support structures are generally pyramid-shaped and have a plurality of the connectors associated with the top plate.

2. The assembly of claim 1, wherein the angle of the connector relative to the base is less than or equal to about forty-five degrees (45°).

3. The assembly of claim 1, wherein the series of support structures are configured in a predetermined manner such that the object is directed toward a center of the assembly.

4. The assembly of claim 1, wherein the support structures assume one of a fully-compressed position and a partially-compressed position when the object interacts with the support structures, and wherein the support structures that are in the partially-compressed position cooperate with the support structures that are in the extended position to provide the lateral retention force to the object.

5. The assembly of claim 1, wherein an aspect ratio of a surface area of a pyramid base to a surface area of the top plate is varied such that the object is directed toward a center of the assembly.

6. The assembly of claim 1, wherein each of the bases is integrally formed with the bases of the support structures that are adjacent thereto.

7. The assembly of claim 1, wherein a fully-compressed position of the connector comprises:
    a convex portion; and
    a concave portion.

8. The assembly of claim 7, wherein at least a portion of the convex portion contacts the object when the connector is in the fully-compressed position.

9. The assembly of claim 7, wherein at least a portion of the concave portion contacts a support surface upon which the assembly is positioned when the connector is in the fully-compressed position.

10. An assembly, comprising:
a series of support structures, each comprising:
   a base, wherein the base is configured to define a discrete contact point with a support surface upon which the series of support structures rest such that each base is free of a direct coupling with immediately adjacent others of the bases;
   a top plate having a continuous surface area and cross-section; and
   a connector extending from the base at an angle and coupling the base to the top plate, wherein the connector assumes a compressed position when under load from an object, wherein the support structures that are in an extended position provide a lateral retention force to the object, and wherein the support structures are generally pyramid-shaped and have a plurality of the connectors associated with the top plate.

11. The assembly of claim 10, wherein the connector extends from the base at an angle such that the top plate is horizontally displaced from the base when the support structure is in the compressed position and the extended position.

12. The assembly of claim 10, wherein a fully-compressed position of the connector comprises:
   a convex portion; and
   a concave portion.

13. The assembly of claim 12, wherein at least a portion of the convex portion contacts the object when the connector is in the fully-compressed position.

14. The assembly of claim 12, wherein at least a portion of the concave portion contacts a support surface upon which the assembly is positioned when the connector is in the fully-compressed position.

15. An assembly, comprising:
a series of support structures, each comprising:
   a base that is integrally formed with the bases of adjacent support structures, wherein each base is configured to define a discrete contact point with a support surface upon which the series of support structures rest such that each base is free of a direct coupling with immediately adjacent others of the bases;
   a top plate having a continuous surface area and cross-section; and
   a connector coupling the base and the top plate, wherein the connector assumes a compressed position when under load from an object, wherein the support structures that are in an extended position provide a lateral retention force to the object, and wherein the support structures are generally pyramid-shaped and have a plurality of the connectors associated with the top plate.

16. The assembly of claim 15, wherein the connector extends from the base at an angle such that the top plate is horizontally displaced from the base when the support structure is in the compressed position and the extended position.

17. The assembly of claim 15, wherein a fully-compressed position of the connector comprises:
   a convex portion; and
   a concave portion.

18. The assembly of claim 17, wherein at least a portion of the convex portion contacts the object when the connector is in the fully-compressed position, and wherein at least a portion of the concave portion contacts a support surface upon which the assembly is positioned when the connector is in the fully-compressed position.

* * * * *